(12) United States Patent
Nagasaki et al.

(10) Patent No.: US 12,532,073 B2
(45) Date of Patent: Jan. 20, 2026

(54) PHOTOELECTRIC CONVERSION APPARATUS, DEVICE, SYSTEM, AND SIGNAL PROCESSING METHOD

(71) Applicant: CANON KABUSHIKI KAISHA, Tokyo (JP)

(72) Inventors: Katsuhiko Nagasaki, Tokyo (JP); Jumpei Ashida, Cupertino, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 43 days.

(21) Appl. No.: 18/755,527

(22) Filed: Jun. 26, 2024

(65) Prior Publication Data

US 2025/0008217 A1   Jan. 2, 2025

(30) Foreign Application Priority Data

Jun. 29, 2023   (JP) .................................. 2023-106779

(51) Int. Cl.
*H04N 23/67* (2023.01)
*H04N 23/61* (2023.01)

(52) U.S. Cl.
CPC ........... *H04N 23/672* (2023.01); *H04N 23/61* (2023.01)

(58) Field of Classification Search
CPC .............................. H04N 23/672; H04N 23/61
USPC ........................................................ 348/349
See application file for complete search history.

(56) References Cited

U.S. PATENT DOCUMENTS

| | | | | |
|---|---|---|---|---|
| 8,103,116 B1* | 1/2012 | Simonson | ............... | G06T 7/254 |
| | | | | 382/236 |
| 8,466,990 B2* | 6/2013 | Nomoto | ............... | H04N 25/683 |
| | | | | 348/241 |
| 9,068,831 B2* | 6/2015 | Monobe | ............. | H04N 23/6811 |
| 10,594,940 B1* | 3/2020 | Persiantsev | ............ | G01B 11/26 |
| 11,563,884 B2* | 1/2023 | Hirose | ............... | H04N 23/6811 |
| 11,682,211 B2* | 6/2023 | Lancia | .................... | G06V 20/41 |
| | | | | 382/103 |
| 2005/0259738 A1* | 11/2005 | Horishi | .................. | H04N 7/014 |
| | | | | 348/E7.013 |
| 2007/0146508 A1* | 6/2007 | Oshima | .................. | H04N 25/68 |
| | | | | 348/E5.079 |
| 2009/0136146 A1* | 5/2009 | Kaino | .................... | H04N 19/51 |
| | | | | 375/240.16 |
| 2011/0102648 A1 | 5/2011 | Nomoto | | |

(Continued)

FOREIGN PATENT DOCUMENTS

| | | |
|---|---|---|
| JP | 2011066835 A | 3/2011 |
| JP | 2017050646 A | 3/2017 |

(Continued)

*Primary Examiner* — Pritham D Prabhakher
(74) *Attorney, Agent, or Firm* — Canon U.S.A., Inc. IP Division

(57) ABSTRACT

An apparatus includes a detection unit that includes a plurality of pixels for acquiring a plurality of pixel values based on amounts of light incident on the plurality of pixels and is configured to detect a difference between the plurality of pixel values, and a control unit configured to control the detection unit. To detect a movement of a subject, the control unit causes the detection unit to perform a first difference detection operation of detecting a difference between a plurality of pixel values of a pixel and a second difference detection operation of detecting a difference between the plurality of pixel values of the plurality of pixels.

19 Claims, 17 Drawing Sheets

| W1 | R1 | W2 | R2 |
|---|---|---|---|
| B1 | E1 | B2 | E2 |
| W3 | R3 | W4 | R4 |
| B3 | E3 | B4 | E4 |

(56) References Cited

U.S. PATENT DOCUMENTS

| | | | |
|---|---|---|---|
| 2012/0020524 A1* | 1/2012 | Ishikawa | H04N 7/183 |
| | | | 382/103 |
| 2021/0004601 A1* | 1/2021 | Lancia | G06V 20/52 |
| 2023/0030415 A1* | 2/2023 | Lim | G06V 10/50 |
| 2023/0239589 A1* | 7/2023 | Miyakoshi | H04N 25/589 |
| | | | 348/308 |
| 2023/0247174 A1* | 8/2023 | Gillis | H04N 21/2343 |

FOREIGN PATENT DOCUMENTS

| | | |
|---|---|---|
| JP | 2020088535 A | 6/2020 |
| JP | 2020096347 A | 6/2020 |
| JP | 2022114740 A | 8/2022 |

\* cited by examiner

FIG.2

| W1 | R1 | W2 | R2 |
|----|----|----|----|
| B1 | E1 | B2 | E2 |
| W3 | R3 | W4 | R4 |
| B3 | E3 | B4 | E4 |

FIG.9

| DAY OF WEEK | TIME | | | | | |
|---|---|---|---|---|---|---|
| | 0 | 4 | 8 | 12 | 16 | 20 24 |
| MONDAY | SPATIAL DIFFERENCE | | TIME DIFFERENCE | | SPATIAL DIFFERENCE | |
| MONDAY | | | | | | |
| TUESDAY | SPATIAL DIFFERENCE | | | | | |
| WEDNESDAY | | | | | | |
| THURSDAY | | | | | | |
| FRIDAY | | | | | | |
| SATURDAY | | | | | | |
| SUNDAY | | | | | | |

PHOTOELECTRIC CONVERSION APPARATUS, DEVICE, SYSTEM, AND SIGNAL PROCESSING METHOD

BACKGROUND

Technical Field

The aspect of the embodiments relates to a photoelectric conversion apparatus, a device, a system, and a signal processing method.

Description of the Related Art

There has been discussed an image capturing apparatuses provided with frame pixels for detecting image data and difference detection pixels for acquiring data based on differences between a plurality of pixel values. Japanese Patent Application Laid-Open No. 2020-96347 discusses an image capturing apparatus that performs time difference detection, which outputs information indicating differences between a plurality of pixel values of a pixel at different times. Pixels for time difference detection allows output without synchronization with frames, providing fast processing. Such pixels can be provided in, for example, an on-vehicle camera to detect pedestrians and oncoming vehicles.

An image capturing apparatus that performs time difference detection as described in Japanese Patent Application Laid-Open No. 2020-96347 cannot provide sufficient accurate difference detection depending on the input image. For example, a vehicle provided with an on-vehicle camera used as the image capturing apparatus and a detection target both at a standstill presents a difficulty in detection of the detection target due to no or small differences between a plurality of pixel values of a pixel at different times.

SUMMARY

According to an aspect of the embodiments, an apparatus includes a detection unit that includes a plurality of pixels for acquiring a plurality of pixel values based on amounts of light incident on the plurality of pixels and is configured to detect a difference between the plurality of pixel values, and a control unit configured to control the detection unit. To detect a movement of a subject, the control unit causes the detection unit to perform a first difference detection operation of detecting a difference between a plurality of pixel values of a pixel and a second difference detection operation of detecting a difference between the plurality of pixel values of the plurality of pixels.

Further features of the disclosure will become apparent from the following description of exemplary embodiments with reference to the attached drawings.

BRIEF DESCRIPTION OF THE DRAWINGS

FIG. 2 illustrates an example of an arrangement of pixels in a pixel block according to the first exemplary embodiment.

FIG. 9 is a schematic diagram illustrating a program according to the third exemplary embodiment.

DESCRIPTION OF THE EMBODIMENTS

In exemplary embodiments described below, an image capturing apparatus will be mainly described as an example of a photoelectric conversion apparatus. However, each exemplary embodiment is not limited to an image capturing apparatus and can also be applied to other examples of a photoelectric conversion apparatus. The other examples include a ranging apparatus (an apparatus that measures a distance using focus detection and time of flight (TOF)) and a photometric apparatus (an apparatus that measures an amount of incident light).

The disclosure of the present specification includes the complement of concepts described in the present specification. More specifically, if the present specification includes a description to the effect that, for example, "A is greater than B", even if a description to the effect that "A is not greater than B" is omitted, it can be said that the present specification still describes that "A is not greater than B". This is because the description that "A is greater than B" assumes a case where "A is not greater than B".

Figure 1:
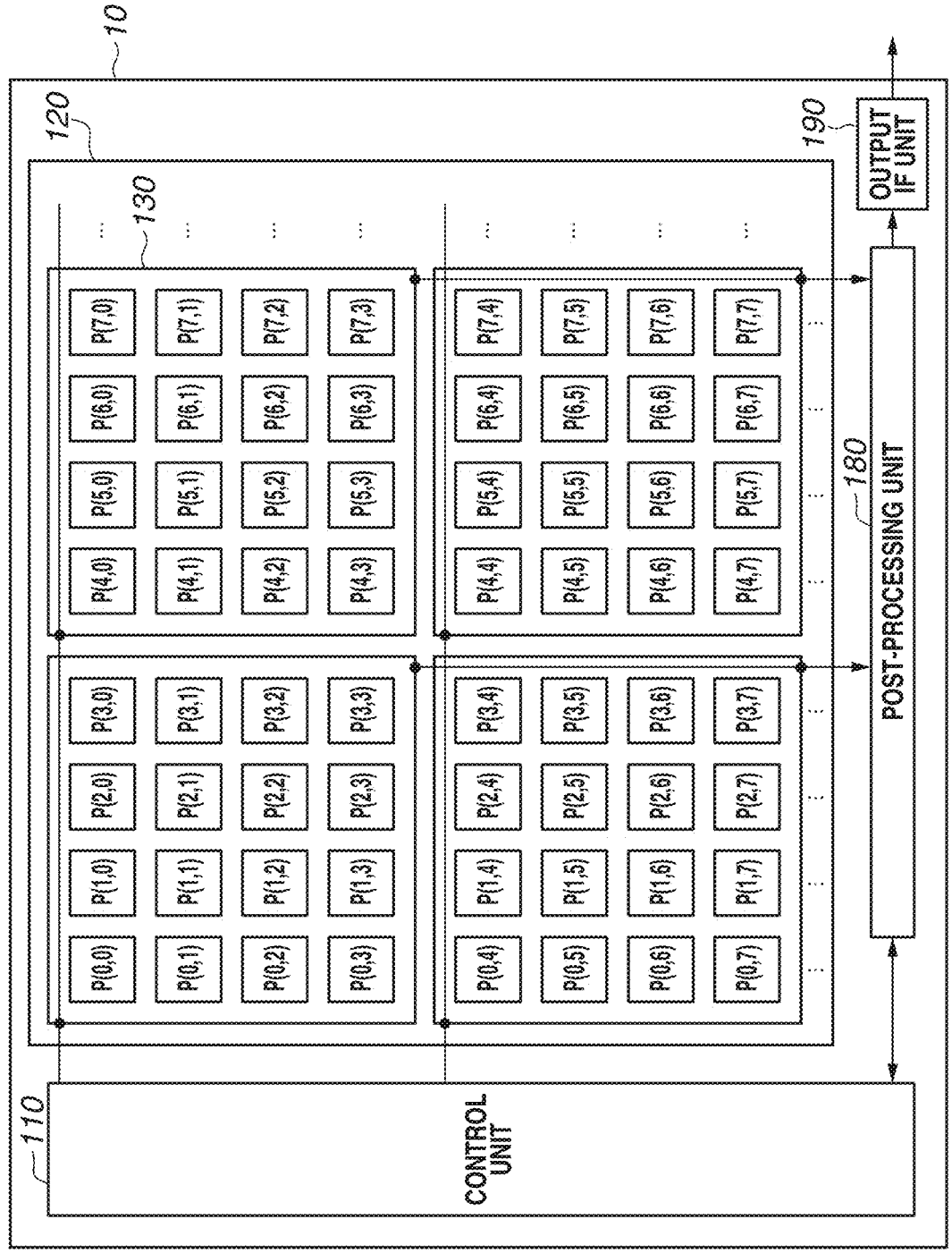
FIG. 1 is a block diagram illustrating the configuration of an image capturing apparatus according to a first exemplary embodiment.

FIG. 1 is a block diagram of the hardware configuration of an image capturing apparatus according to a first exemplary embodiment. An image capturing apparatus 10 includes a control unit 110, a detection unit 120, a post-processing unit 180, and an output interface (IF) unit 190.

The detection unit 120 includes a plurality of pixel blocks 130. In the following description of the present exemplary embodiment, an example is described in which one pixel block 130 includes 16 pixels P, but the number of the pixels P included in the pixel block 130 is not limited to this example.

Figure 2:
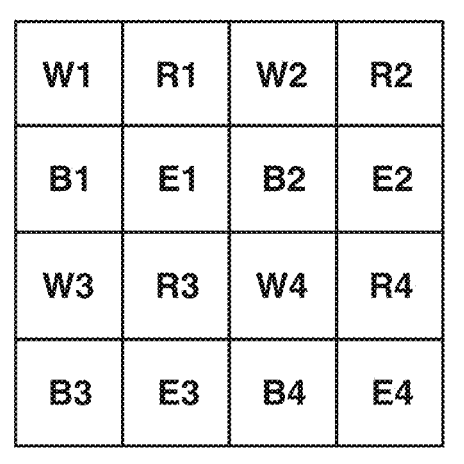

FIG. 2 illustrates an example of an arrangement of the pixels P in the pixel block 130. Frame pixels W1 to W4, R1 to R4, and B1 to B4 are used to acquire image data, and difference detection pixels E1 to E4 are used to output data based on differences between a plurality of pixel values. The arrangement in FIG. 2 is an example, and, for example, a configuration can be used in which ranging pixels for measuring the distance to a subject are mixed.

The frame pixels output pixel values based on a fixed cycle. Here, the frame pixels W1 to W4, R1 to R4, and B1 to B4 are pixels using color filters of white, red, and blue, respectively. However, they are examples, and the frame pixels W1 to W4, R1 to R4, and B1 to B4 can use different color filters or can be used as black and white pixels without using any color filters.

Each of the difference detection pixels outputs a pixel value asynchronously with the cycle used by the frame pixels. The pixel values output from the difference detection pixels are used, for example, for detecting a moving object within the imaging area of the image capturing apparatus by performing various difference detection modes, which are described below. Specifically, the difference detection pixel values are used for detecting the movement of a subject within an imaging area of the image capturing apparatus. The difference detection pixels are suitably used to detect pedestrians or oncoming vehicles using the image capturing apparatus as an on-vehicle camera.

The post-processing unit 180 processes an output from the detection unit 120. For example, the post-processing unit 180 performs image processing based on an output of each frame pixel, difference detection processing based on an output of each difference detection pixel, and moving object recognition processing based on a detected difference. These processing results are output from the post-processing unit 180 to the control unit 110 and the output IF unit 190. The control unit 110 receives the processing result from the post-processing unit 180 and controls the detection unit 120 based on the processing result. The output IF unit 190 outputs the output from the post-processing unit 180 to an external device. The post-processing unit 180 can be provided outside the image capturing apparatus 10. In this case, a system is constructed in which the post-processing unit 180 provided outside the image capturing apparatus 10 performs each of the above-described pieces of processing on the output from the detection unit 120.

Figure 3:
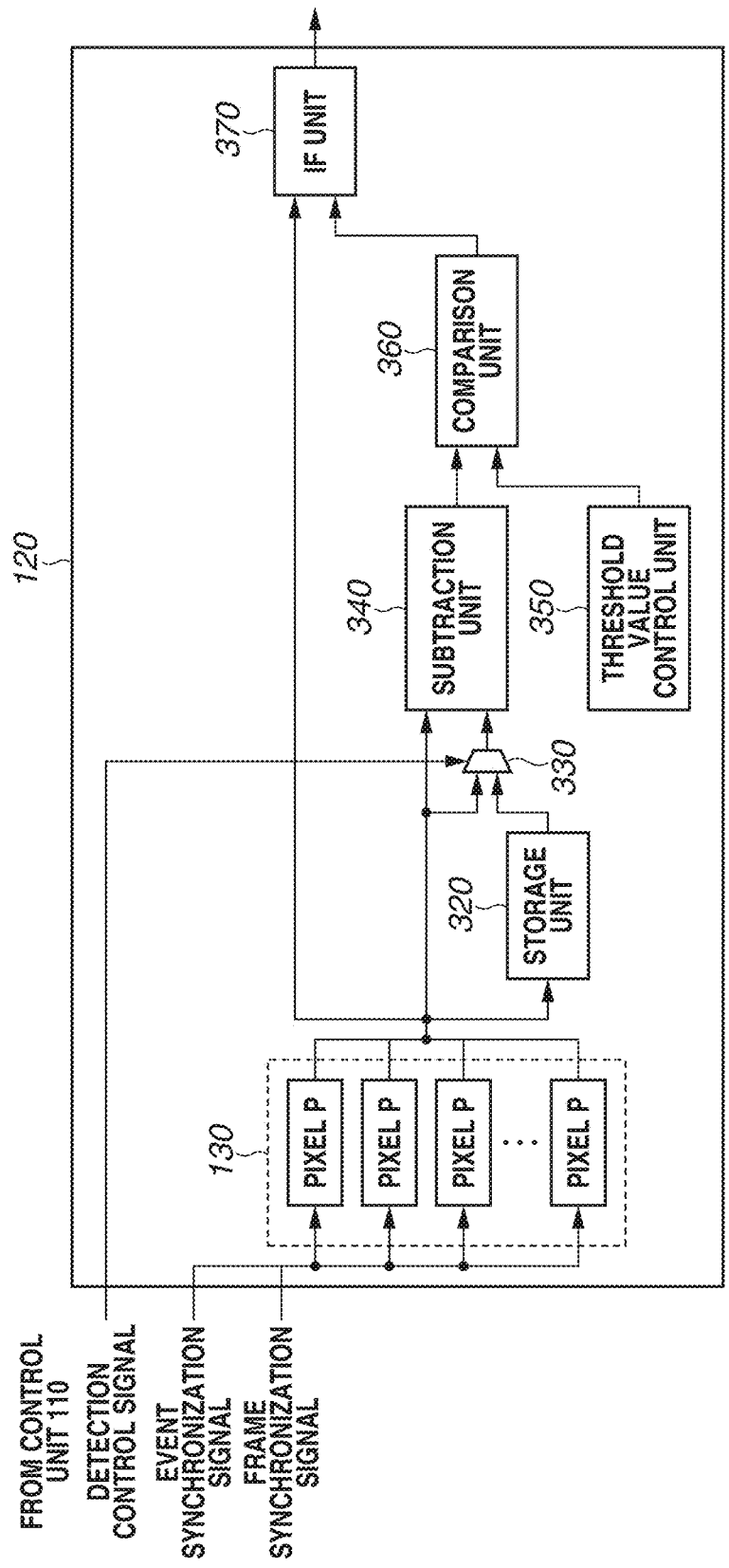
FIG. 3 is a block diagram illustrating the configuration of a detection unit according to the first exemplary embodiment.

FIG. 3 is a block diagram illustrating a configuration of the detection unit 120. Only one pixel block 130 is illustrated in FIG. 3, but the detection unit 120 can include a plurality of pixel blocks 130.

Each pixel P in the pixel block 130 outputs a pixel value corresponding to the amount of incident light based on an event synchronization signal and a frame synchronization signal from the control unit 110 to a subsequent stage. A storage unit 320 stores the pixel value of each pixel P. A selection unit 330 selects an input to a subtraction unit 340 based on a detection control signal from the control unit 110.

The subtraction unit 340 calculates the difference between two specific pixel values among a plurality of input pixel values. The subtraction unit 340 includes one or a plurality of subtraction circuits. According to the present exemplary embodiment, there are four difference detection pixels arranged in one pixel block 130, allowing the plurality of subtraction circuits to simultaneously perform four sets of subtraction.

For example, in a time difference mode described below, subtraction is performed on four sets of pixel values, which are pixel values detected at a certain time and pixel value detected immediately before the detection of those of the respective difference detection pixels E1 to E4. Further, for example, in a spatial difference mode described below, subtraction is performed on four sets of pixel values detected from adjacent difference detection pixels, namely the difference detection pixels E1 and E2, E1 and E3, E2 and E4, and E3 and E4. The number of sets of the subtraction is not limited to this example, and can be any other number depending on the number of difference detection pixels and subtraction circuits to be arranged.

A threshold value control unit 350 sets a threshold value used in calculation of a comparison unit 360. The comparison unit 360 compares the value calculated by the subtraction unit 340 and the threshold value set by the threshold value control unit 350, and outputs if the calculated value exceeds the threshold value. The subtraction unit 340, the threshold value control unit 350, and the comparison unit 360 constitutes a comparison unit. An IF unit 370 outputs a processing result of the comparison unit 360 to a subsequent stage.

Difference detection operations according to the present exemplary embodiment will be described with reference to a flowchart in FIG. 4. Operations described assume a case where the image capturing apparatus is installed into a vehicle as an on-vehicle camera.

In step S401, if a start of difference detection is instructed (YES in step S401), the processing proceeds to step S402. In step S402, a movement status of the vehicle is determined. Specifically, it is determined whether the vehicle is running (moving) or stopped. For determination, a known technique, such as one that uses an acceleration sensor, can be used. If it is determined that the vehicle is running (YES in step S402), the processing proceeds to step S403, and if is determined that the vehicle is stopped (NO in step S402), the processing proceeds to step S404.

In step S403, the selection unit 330 receives a detection control signal from the control unit 110 and selects an input to the subtraction unit 340. In this step, the pixel value from the pixel P and the pixel value immediately previously output from the same pixel P read from the storage unit 320 are selected. Specifically, respective combinations of the pixel value and the previous pixel value of the difference detection pixel E1, the pixel value and the previous pixel value of the difference detection pixel E2, the pixel value and the previous pixel value of the difference detection pixel E3, and the pixel value and the previous pixel value of the difference detection pixel E4 are input to the subtraction unit 340.

The subtraction unit 340 performs subtraction on these inputs, and thus derives a time difference value for the same pixel. The comparison unit 360 compares the time difference value with the threshold value set by the threshold value control unit 350, and outputs the result to the post-processing unit 180 via the IF unit 370. Such an operation mode will be referred to as the time difference mode.

In step S404, the selection unit 330 receives the detection control signal from the control unit 110 and selects an input to the subtraction unit 340. In this step, pixel values from each of two adjacent difference detection pixels are selected as inputs. Here, adjacent pixels include not only directly adjacent pixels but also those adjacent via the frame pixel, such as the difference detection pixels E1 and E2, E3 and E4, E1 and E3, and E2 and E4.

The subtraction unit 340 subtracts these inputs (sets of pixel values) from each other and thus calculates a spatial difference value between the two adjacent difference detection pixels. The comparison unit 360 compares the spatial difference value with the threshold value set by the threshold value control unit 350 and outputs the result to the post-processing unit 180 via the IF unit 370. Such an operation mode will be referred to as the spatial difference mode.

In step S405, it is determined whether the termination of the difference detection is instructed, and if the termination is not instructed (NO in step S405), the processing returns to step S402 and continues. If the termination is instructed (YES in step S405), the difference detection processing is terminated.

The above-described operations allow the time difference mode or the spatial difference mode to be selected and difference information to be output based on the state of the image capturing apparatus 10. In this way, when it is difficult to recognize a detection target in one difference detection mode, the mode can be switched to the other difference detection mode, producing an effect of improving accuracy of detecting the detection target.

According to the present exemplary embodiment, the time difference mode and the spatial difference mode are switched based on the state of the vehicle, but another configuration can be used. For example, a case is assumed where the image capturing apparatus performs an autofocus operation (focus detection operation) using the difference detection pixel. The autofocus operation searches for an appropriate focus state based on pixel values, so that if a pixel value is not output, the focus operation cannot be appropriately performed. For example, if processing is performed in the time difference mode with no moving object within the imaging range of the image capturing apparatus, no pixel value is output, and the focus operation cannot be performed.

Figure 4:
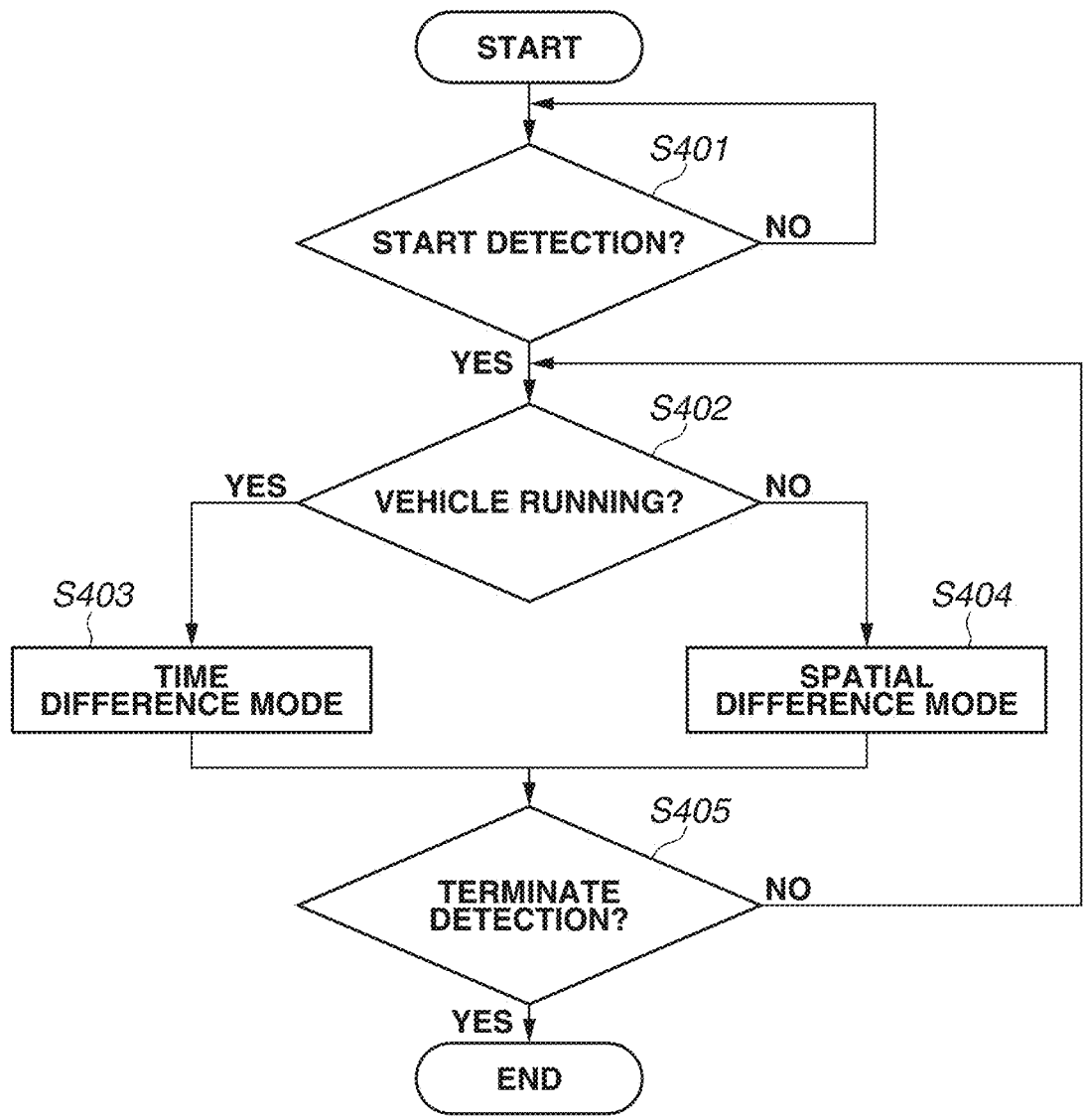
FIG. 4 illustrates an operation flowchart according to the first exemplary embodiment.

Thus, the determination step in step S402 in the operation flowchart in FIG. 4 can be a determination step of whether the autofocus operation is performed. If the autofocus operation is not performed, the time difference mode can be set, and if the autofocus operation is performed, the spatial difference mode can be set.

Further, as another configuration, the time difference mode and the spatial difference mode can be switched depending on presence or absence of illuminance variation. If the time difference mode is used with illuminance variation in an entire captured image, a difference will be detected over the entire image even if a moving object is not present in the image. Thus, the difference detection mode can be switched to the spatial difference mode by detecting the presence or absence of illuminance variation.

In this case, an illuminance detection unit that detects illuminance can be realized using a known technique. For example, a part of the pixels included in the image capturing apparatus 10 can be used as the illuminance detection unit, or an illuminance meter can be installed into the image capturing apparatus 10 or a part other than the image capturing apparatus of the vehicle to detect illuminance.

The detection unit 120 is described above as having the configuration that includes both frame pixels and difference detection pixels, but the detection unit 120 can be configured with only difference detection pixels. Further, the pixels in the pixel block 130 can have an arrangement and a configuration other than that illustrated in FIG. 2. Furthermore, the threshold value set to the threshold value control unit 350 is not limited to one, and a plurality of threshold values can be set. For example, it can be determined which of a plurality of threshold values is exceeded, displaying it on an image in a recognizable manner.

The difference detection pixel can be configured with a color filter, or as a black and white pixel without a color filter. If a plurality of color filters is used for the difference detection pixel, in one embodiment, a difference from a plurality of difference detection pixels provided with a color filter in the spatial difference mode is detected.

A second exemplary embodiment will be described. According to the second exemplary embodiment, the difference detection mode is selected according to a comparison result by the comparison unit 360. Only a part different from the above-described exemplary embodiment will be described.

Figure 5:
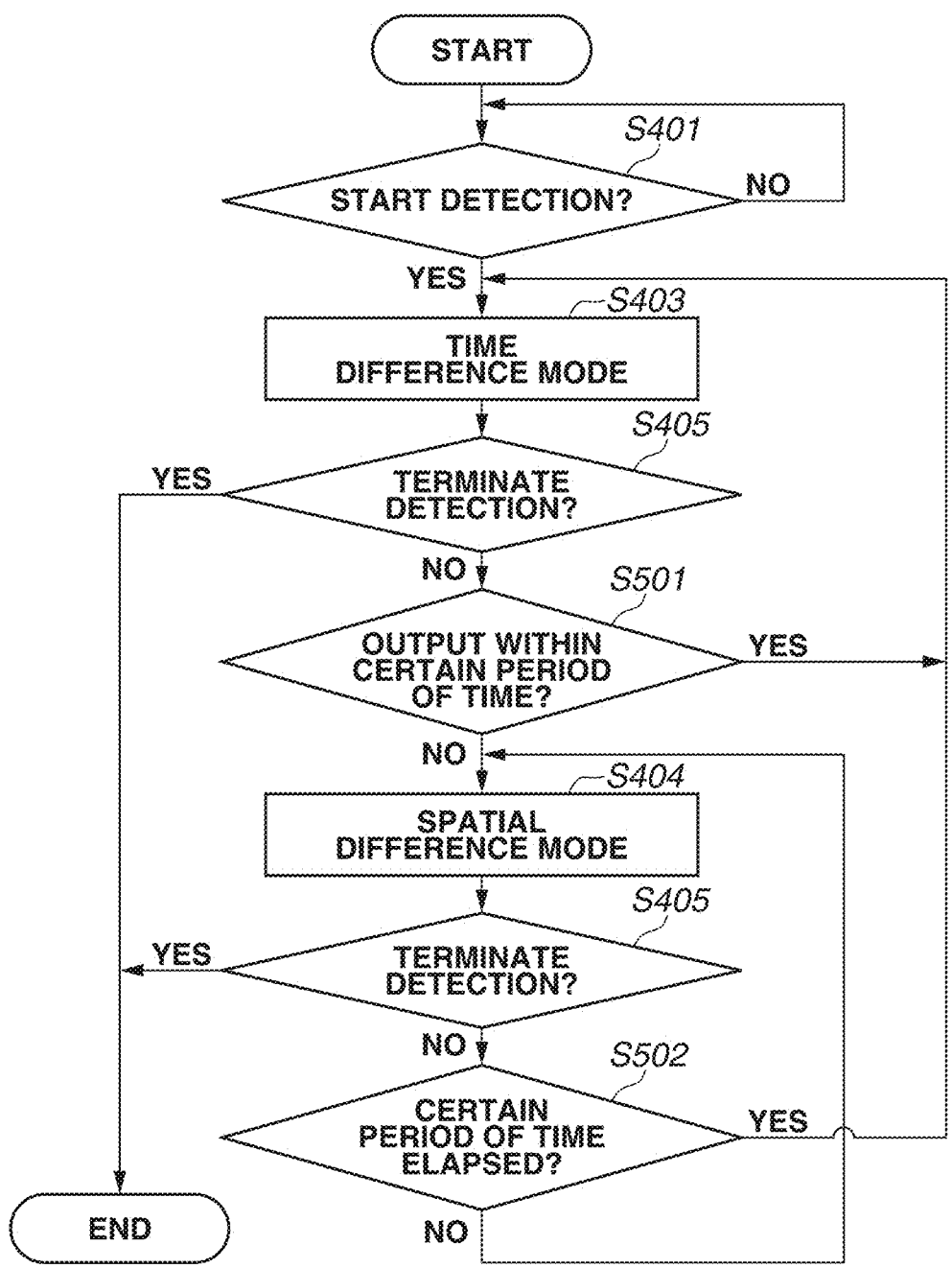
FIG. 5 illustrates an operation flowchart according to a second exemplary embodiment.

FIG. 5 illustrates an operation flowchart according to the present exemplary embodiment. Steps that perform processing similar to those according to the above-described exemplary embodiment are denoted by the same numbers.

In step S401, if a start of difference detection is instructed (YES in step S401), the processing proceeds to step S403, and the processing is started in the time difference mode.

In step S501, it is determined whether there is an output from the comparison unit 360 within a predetermined certain period of time. For example, with the image capturing apparatus used as an on-vehicle camera, if there is no output in the time difference mode for more than ten minutes, it is highly likely that the vehicle is parked in a place with few moving objects around it, and in such a case, the mode is switched to the spatial difference mode. If there is no output within the certain period of time (NO in step S501), the processing proceeds to step S404, and the processing is switched to the spatial difference mode. If there is an output within the certain period of time (YES in step S501), the processing proceeds to step S403, and the processing continues in the time difference mode.

In step S502, it is determined whether the predetermined certain period of time has elapsed after switching to the spatial difference mode. If the certain period of time has elapsed (YES in step S502), the processing proceeds to step S403, and the processing is switched to the time difference mode. If the certain period of time has not elapsed (NO in step S502), the processing proceeds to step S404, and the processing continues in the spatial difference mode.

Each step described above is executed, allowing the difference detection mode to be switched to output information when a state with no output continues, producing an effect of improving the accuracy of various types of processing, such as recognition processing in the post-processing unit 180.

Further, for example, with the image capturing apparatus used as a monitoring camera in a place with few moving objects, if a state with no output continues for a long time in the time difference mode, there is a possibility that it cannot be determined whether there is no moving object in the imaging area or the image capturing apparatus fails. According to the present exemplary embodiment, the detection method in the spatial difference mode allows difference information to be output even if there is no movement in the imaging area, producing an effect of easily checking the presence or absence of a failure.

In the above description, if there is no output within the certain period of time in step S501, the time difference mode is switched to the spatial difference mode, but the processing is not limited to this. For example, if there is no output, the time difference mode continues, and if there is an output, the time difference mode can be switched to the spatial difference mode. In this case, if there is no change in the imaging area, no output operation is performed, producing an effect of reducing power consumption of the image capturing apparatus. Further, an interval of the time difference detection can be lengthened if the time period with no output continues. In this case, it has an effect of further reducing power consumption.

A third exemplary embodiment will be described. According to the third exemplary embodiment, the difference detection mode is switched according to a predetermined program. Only a part different from the above-described exemplary embodiments will be described.

Figure 6:
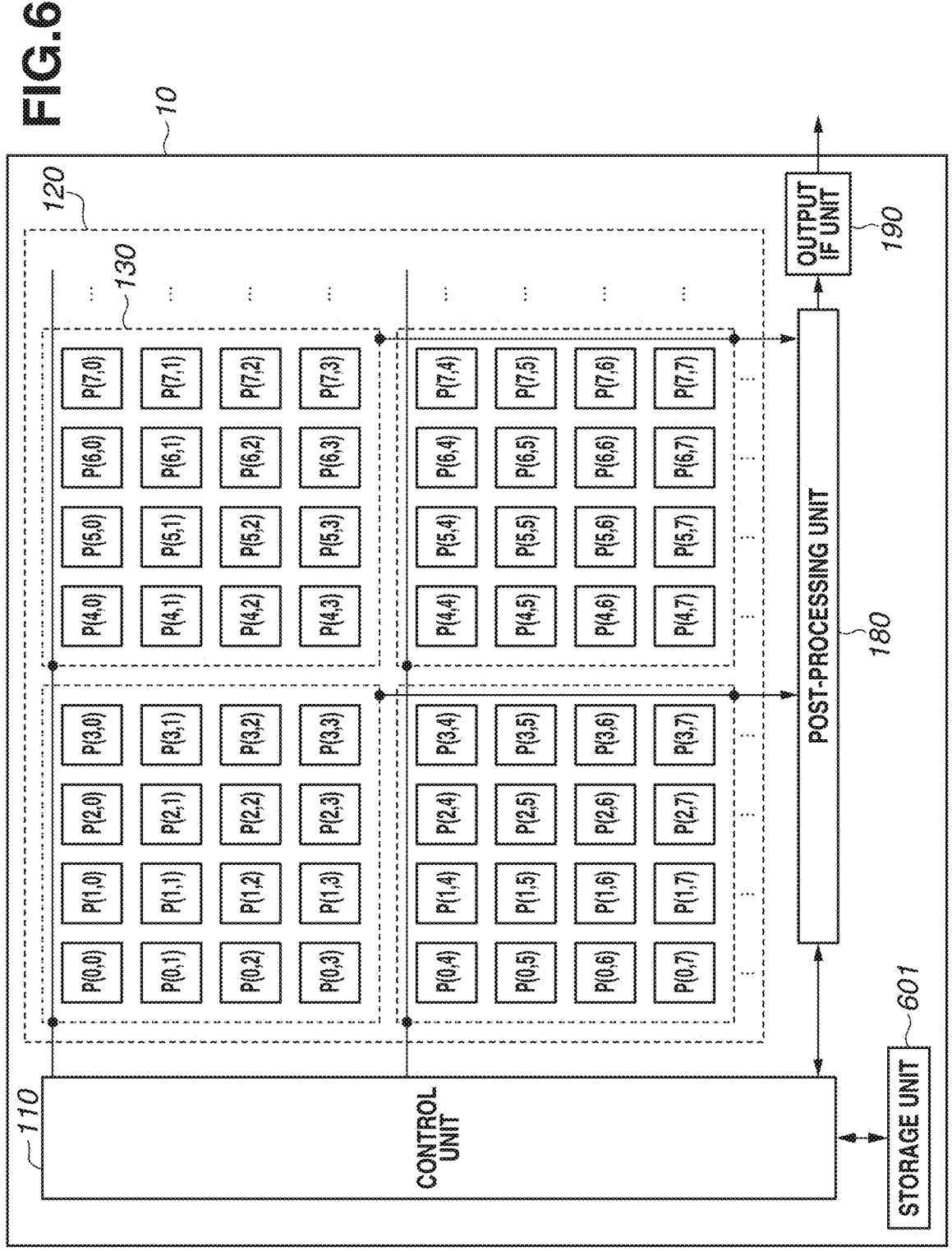
FIG. 6 is a block diagram illustrating the configuration of an image capturing apparatus according to a third exemplary embodiment.
Figure 7:
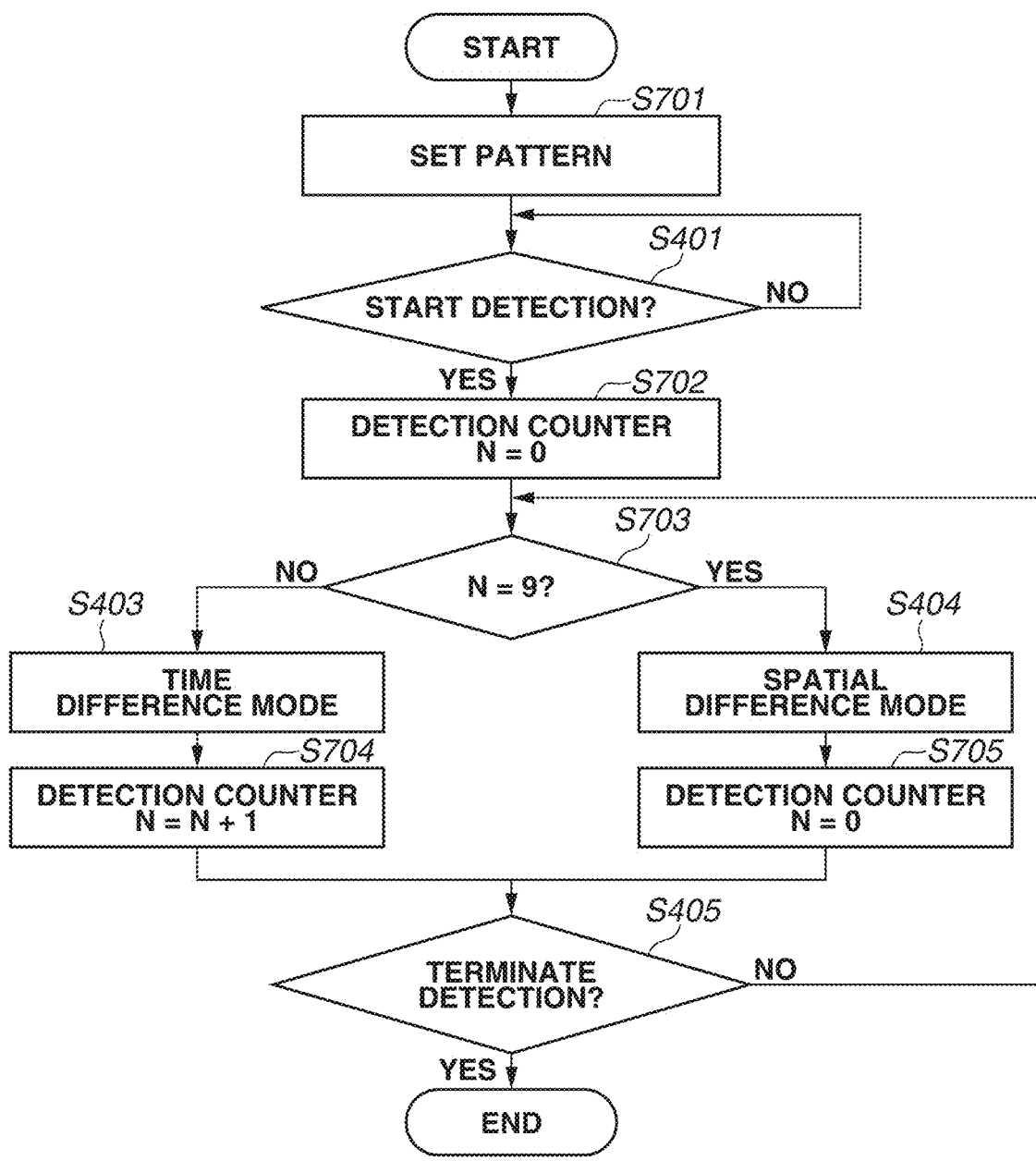
FIG. 7 illustrates an operation flowchart according to the third exemplary embodiment.

FIG. 6 is an example of a block diagram illustrating a hardware configuration according to the present exemplary embodiment. A storage unit 601 stores a program based on the switching pattern of the difference detection mode. FIG. 7 illustrates an operation flowchart according to the present exemplary embodiment. Steps that perform processing similar to those according to the above-described exemplary embodiments are denoted by the same numbers.

In step S701, a program storing the switching pattern of the difference detection mode is set to the storage unit 601, and the processing proceeds to step S702. The following is an example in which out of ten times of difference detection, nine times are performed in the time difference mode and one time is performed in the spatial difference mode.

In step S702, a counter value is set to N=0 in a detection counter (not illustrated) provided in the control unit 110, and the processing proceeds to step S703.

In step S703, it is determined whether the counter value is N=9. If the counter value is not N=9 (NO in step S703), the processing proceeds to step S403, and the processing is performed in the time difference mode. If the counter value is N=9 (YES in step S703), the processing proceeds to step S404, and the processing is performed in the spatial difference mode.

In step S704, the counter value is set to N=N+1, and the processing proceeds to step S405. On the other hand, in step S705, the counter value is set to N=0, and the processing proceeds to step S405.

The above-described operations allow switching between the time difference mode and the spatial difference mode according to a predetermined operation program.

Figure 8:
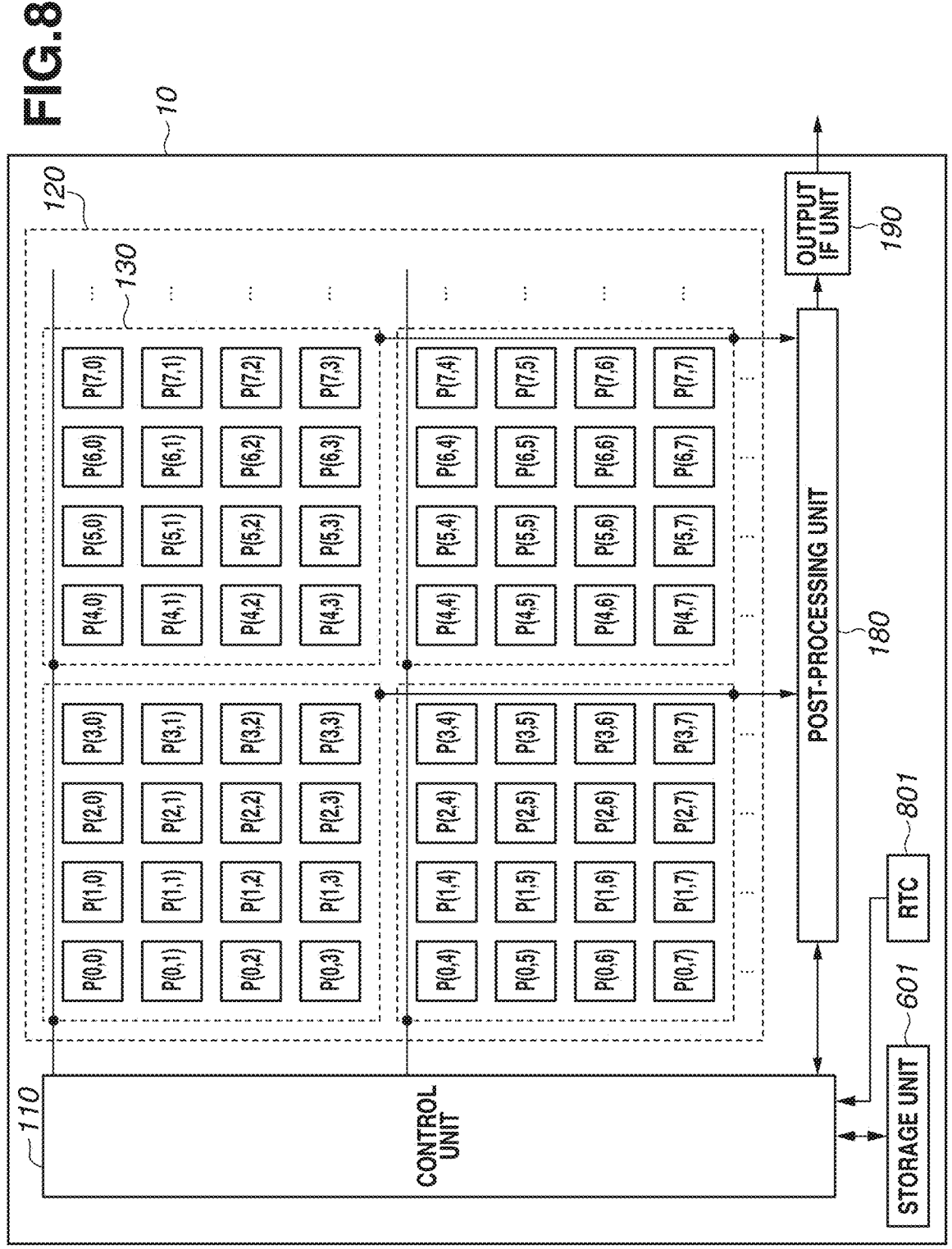
FIG. 8 is a block diagram illustrating a configuration of the image capturing apparatus according to the third exemplary embodiment.

The program to be set can perform switching based on time information. FIG. 8 is a block diagram illustrating a hardware configuration according to the present exemplary embodiment. The time information can be read from a real time clock (RTC) 801.

FIG. 9 is a schematic diagram of a program based on the time information. Time zones from 8 o'clock to 16 o'clock from Monday to Friday are set to the time difference mode, and other time zones are set to the spatial difference mode. Such a setting is an example suitable for a monitoring camera in an office.

Figure 10:
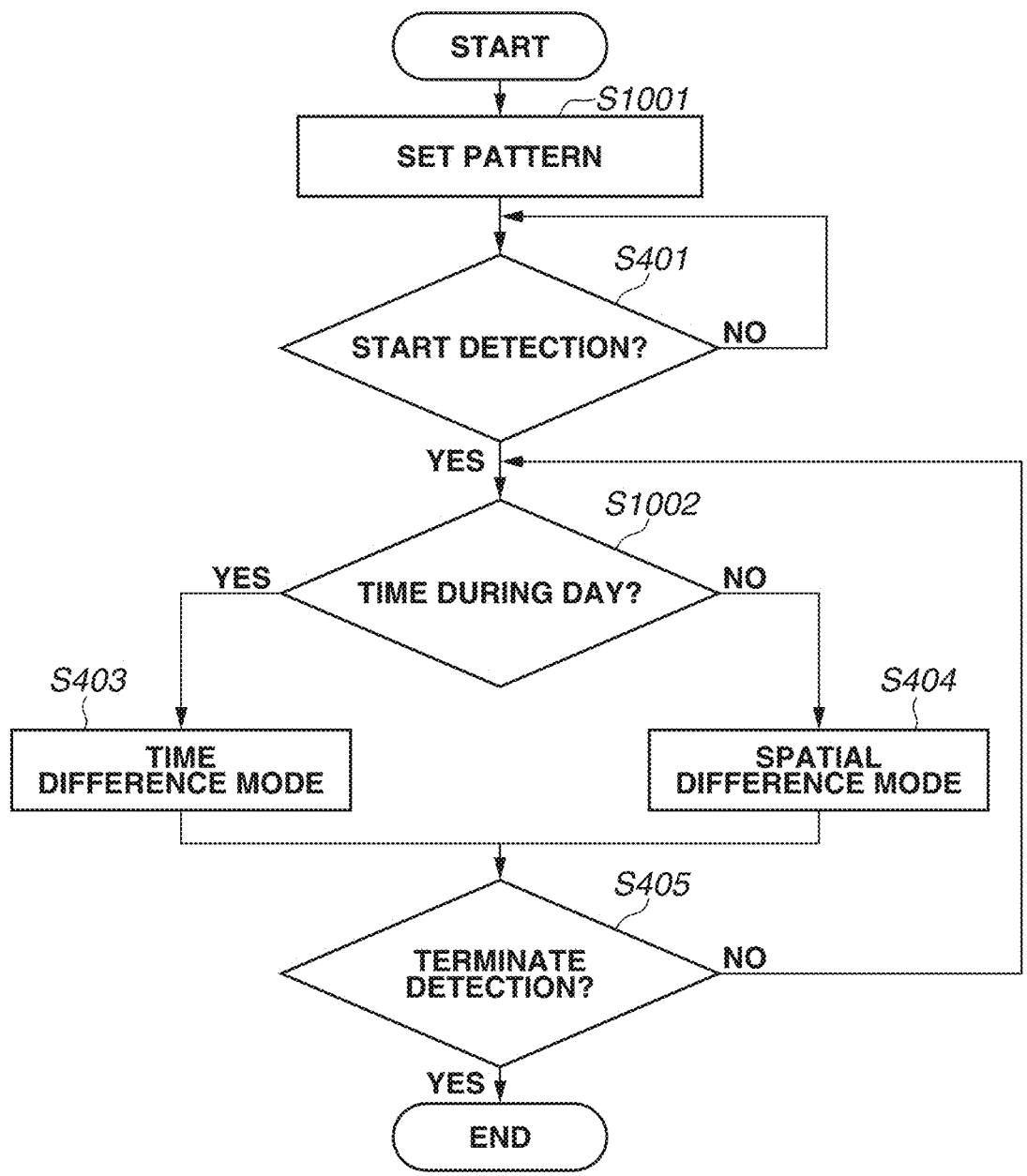
FIG. 10 illustrates an operation flowchart according to the third exemplary embodiment.

FIG. 10 illustrates an operation flowchart according to the present exemplary embodiment. Steps that perform processing similar to those according to the above-described exemplary embodiments are denoted by the same numbers.

In step S1001, the storage unit 601 stores a program that associates time with the difference detection modes as illustrated in FIG. 9, and the processing proceeds to step S401.

In step S1002, the time information is read from the RTC 801, and it is determined which difference detection mode is used for the processing based on the program. If it is determined as the time difference mode (YES in step S1002), the processing proceeds to step S403 and is performed in the time difference mode. If it is determined as the spatial difference mode (NO in step S1002), the processing proceeds to step S404 and is performed in the spatial difference mode. In the flowchart in FIG. 10, an example is described in which the processing is performed in the time difference mode during the day, and the spatial difference mode is used in other time zones, but a correspondence relationship between time and the difference detection modes is not limited to this example.

The above-described processing allows switching to a suitable difference detection mode according to the predetermined program, producing an effect of improving the accuracy of various types of processing, such as recognition processing in the post-processing unit 180.

A fourth exemplary embodiment will be described. According to the above-described exemplary embodiments, switching between the difference detection modes is generally applied to all difference detection pixels, but according to the fourth exemplary embodiment, an example is described in which switching of the difference detection modes is applied, for example, to each pixel block 130. In this configuration, the control unit 110 transmits a detection control signal to each pixel block 130 individually.

Figure 11:
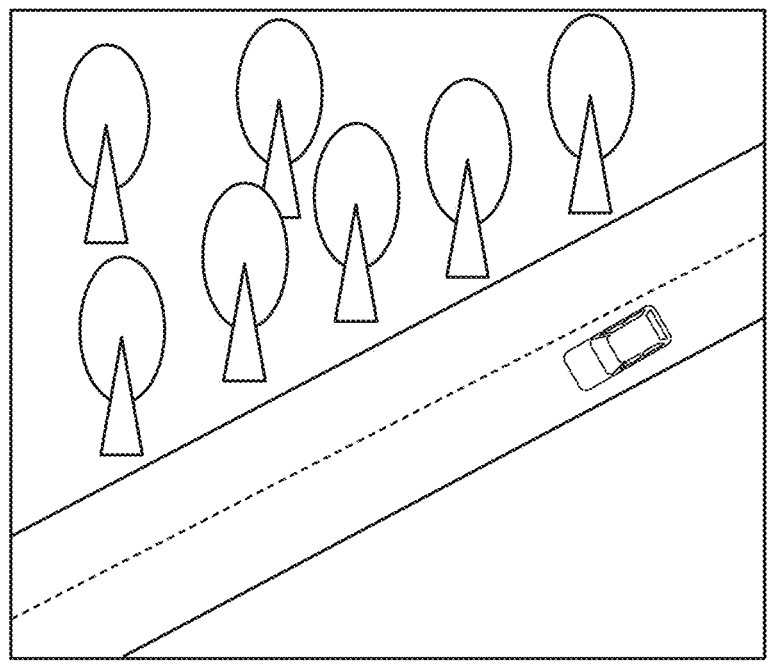
FIG. 11 is a schematic diagram illustrating a captured image according to a fourth exemplary embodiment.
Figure 12:
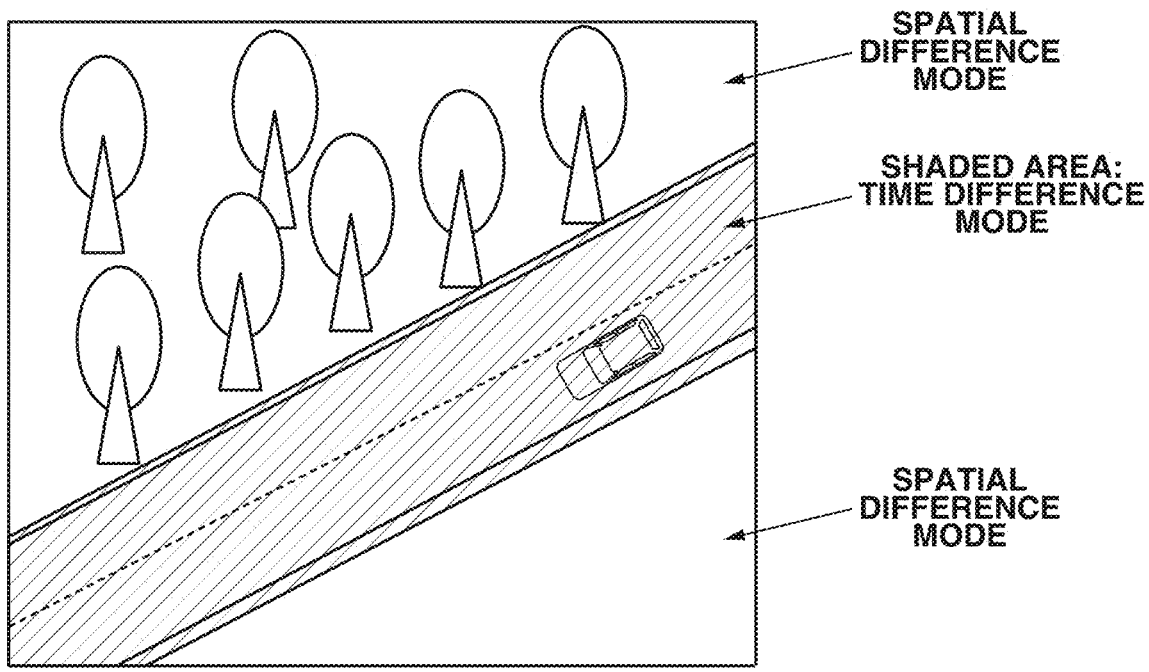
FIG. 12 is a schematic diagram illustrating a setting example according to the fourth exemplary embodiment.

FIG. 11 is a schematic diagram of an image captured by a monitoring camera installed outdoors. Moving objects are frequently detected on a road crossing the center of the image. Vehicles pass thereon, but there are almost no moving objects in other areas. FIG. 12 illustrates an example of a setting of a difference detection mode for each pixel block 130 in such a case. Specifically, an area including the road is set to the time difference mode, and the other areas are set to the spatial difference mode.

Figure 13:
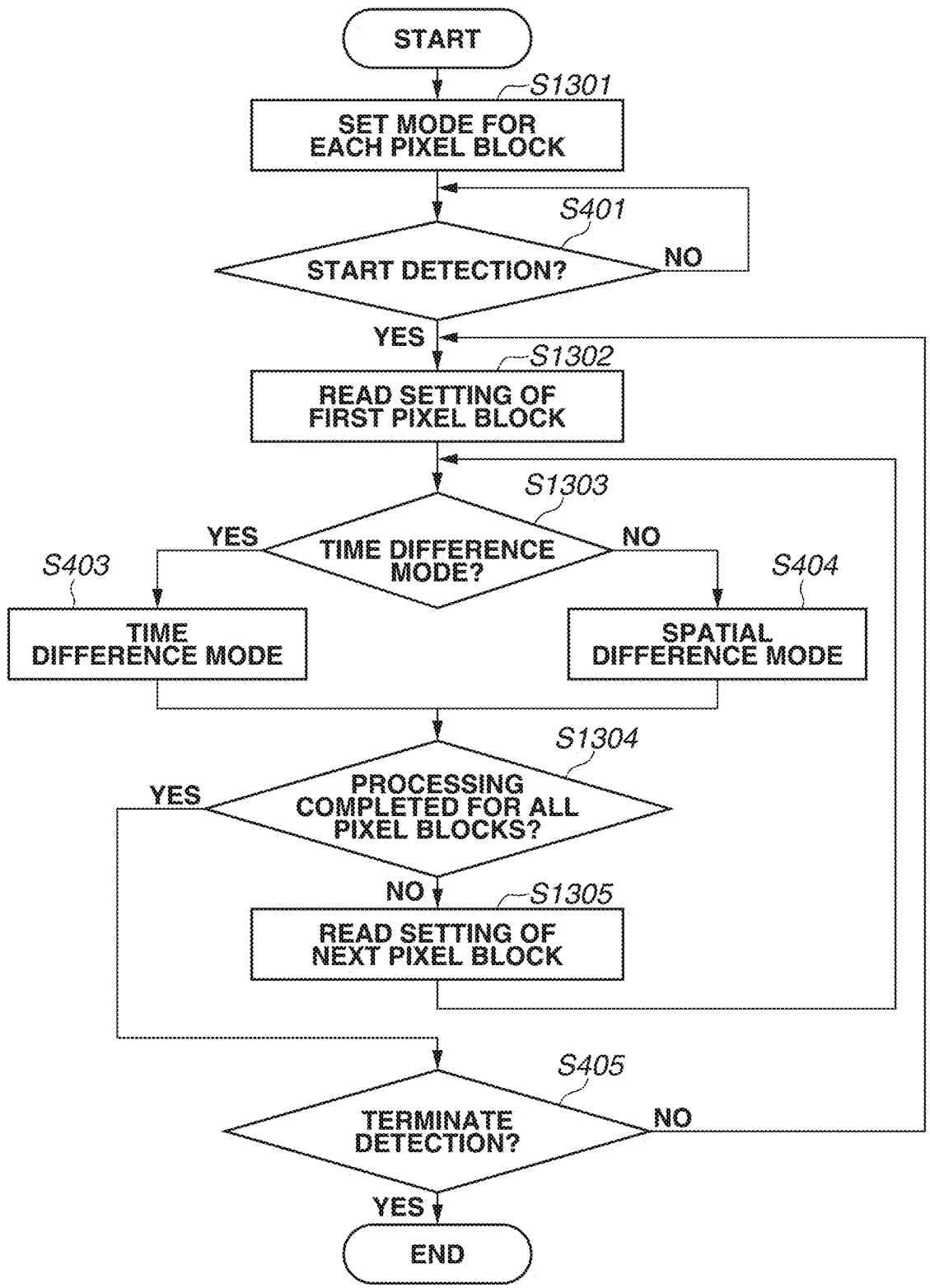
FIG. 13 illustrates an operation flowchart according to the fourth exemplary embodiment.

FIG. 13 illustrates an example of an operation flowchart according to the present exemplary embodiment. Steps that perform processing similar to those according to the above-described exemplary embodiments are denoted by the same numbers.

In step S1301, the storage unit 601 stores the setting of a difference detection mode to each of a plurality of the pixel blocks 130, and the processing proceeds to step S401.

In step S1302, the setting of the first pixel block 130 is read from the storage unit 601, and the processing proceeds to step S1303.

In step S1303, it is determined which difference detection mode is set for the processing of the first pixel block 130. If the setting is the time difference mode (YES in step S1303), the processing proceeds to step S403, and if the setting is the spatial difference mode (NO in step S1303), the processing proceeds to step S404. FIG. 13 illustrates an example in which it is determined whether the difference detection mode is the time difference mode, and if the determination result is YES, the processing is performed in the time difference mode, whereas if the determination result is NO, the processing is performed in the spatial difference mode.

In step S1304, it is determined whether the difference detection processing is completed for all the pixel blocks 130. If the difference detection processing is completed (YES in step S1304), the processing proceeds to step S405, and if the difference detection processing is not completed (NO in step S1304), the processing proceeds to step S1305.

In step S1305, the setting of the next pixel block 130 is read from the storage unit 601, and the processing returns to step S1303 and is repeated.

In step S405, it is determined whether the detection is terminated, and if the detection is not terminated (NO in step S405), the processing returns to step S1302 and is repeated from the first pixel block 130.

According to the above-described processing, the difference detection mode is set based on a characteristic of each area in a captured image, producing an effect of improving the accuracy of various types of processing, such as recognition processing in the post-processing unit 180. Further, in the above description, the difference detection mode is switched for each pixel block 130, but the disclosure is not limited to this example. The difference detection mode can be switched for, for example, each of the plurality of pixel blocks 130.

A fifth exemplary embodiment will be described. According to the first to fourth exemplary embodiments, the pixels in the pixel block 130 are configured so that both the time difference mode and the spatial difference mode can be selected as the difference detection modes, but the pixel block 130 having one of the difference detection modes can be selectively arranged on the image capturing apparatus.

Figure 14:
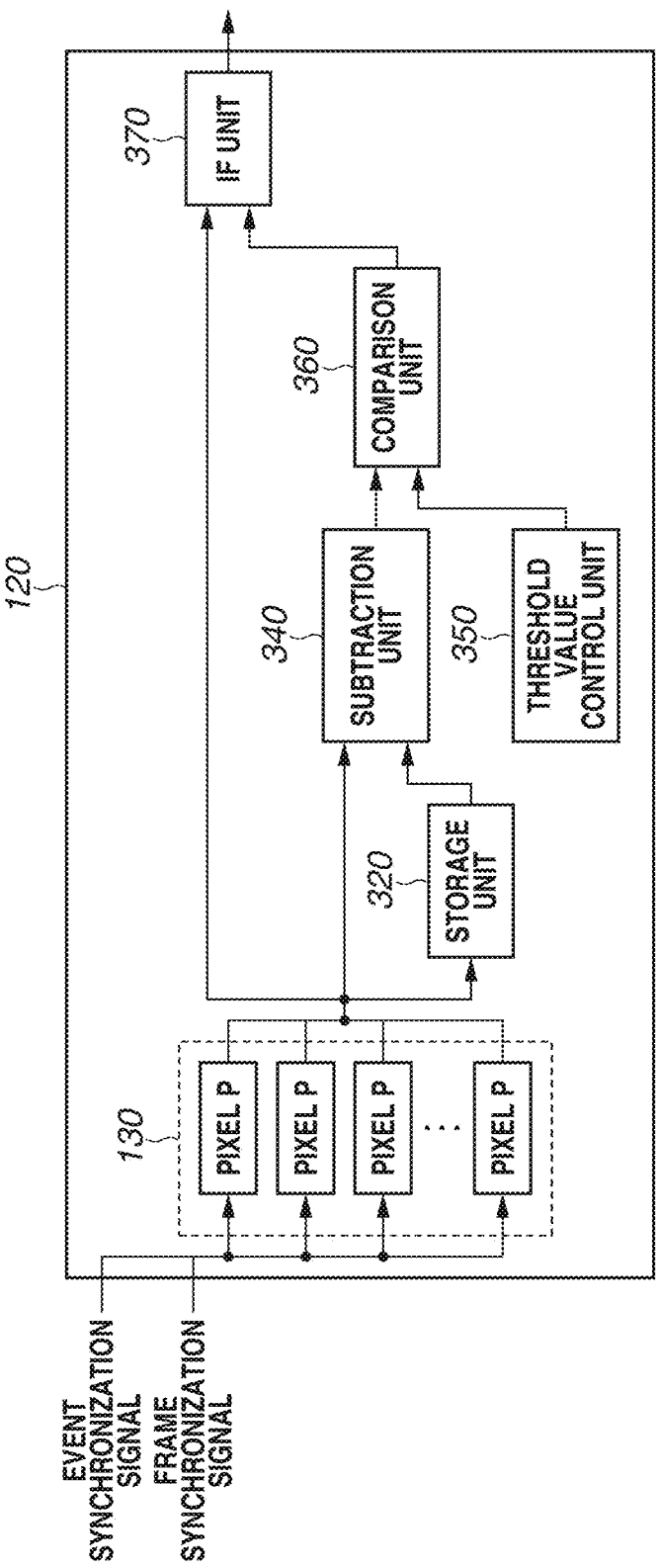
FIG. 14 is a block diagram illustrating the configuration of a detection unit according to a fifth exemplary embodiment.
Figure 15:
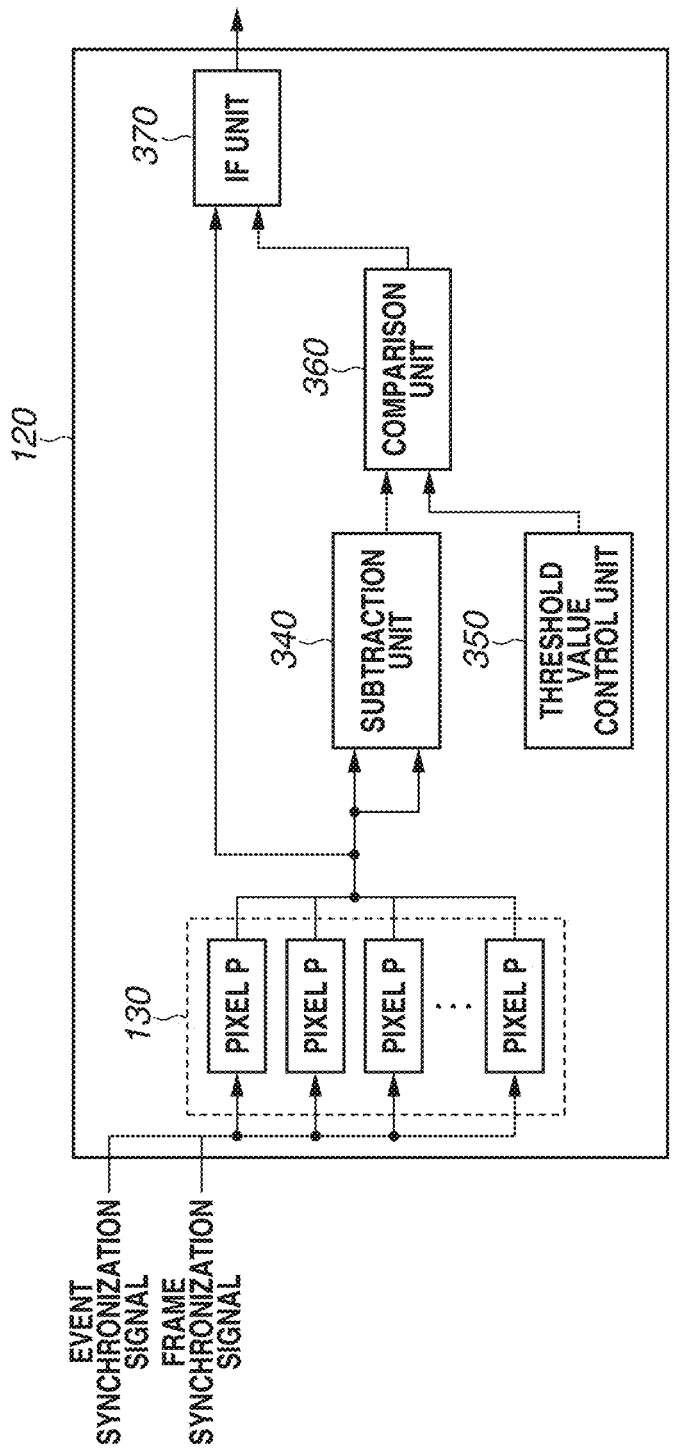
FIG. 15 is a block diagram illustrating a configuration of the detection unit according to the fifth exemplary embodiment.

FIG. 14 illustrates a configuration of the detection unit 120 with the time difference mode alone provided in it. FIG. 14 illustrates the configuration in which the selection unit 330 is eliminated from the configuration in FIG. 3. Further, FIG. 15 illustrates a configuration with the spatial difference mode alone provided in it. FIG. 15 illustrates the configuration in which the storage unit 320 is further eliminated from the configuration in FIG. 14.

Figure 16:
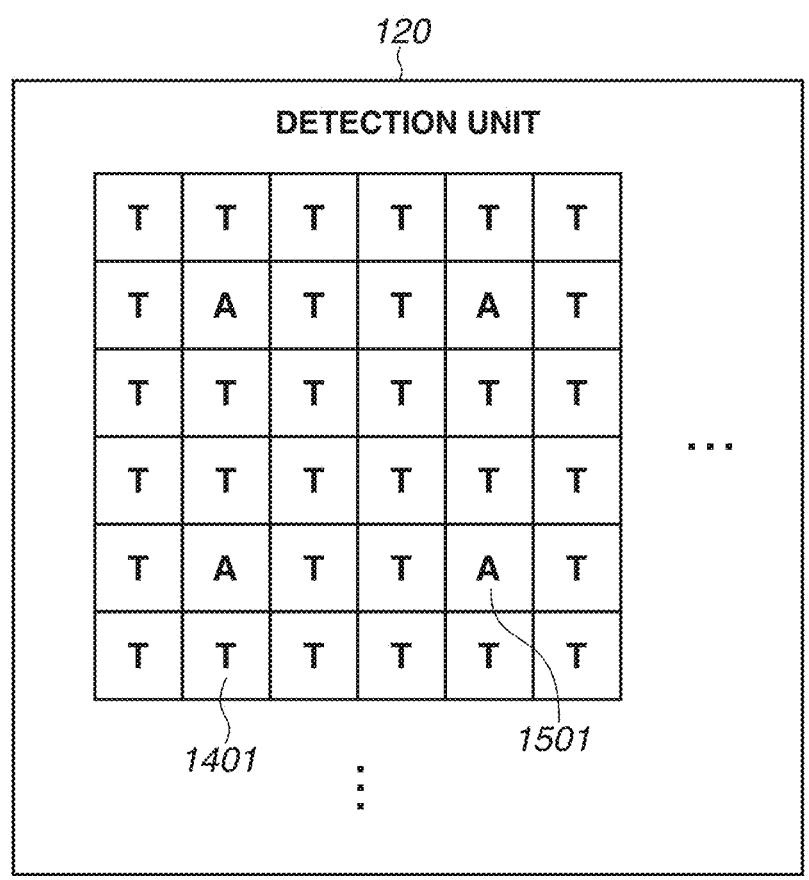
FIG. 16 is a schematic diagram illustrating an example of an arrangement of pixel blocks according to the fifth exemplary embodiment.

FIG. 16 illustrates an example in which pixel blocks 1401 having the time difference mode alone and pixel blocks 1501 having the spatial difference mode alone are arranged in the detection unit 120. The pixel blocks 1401 are arranged at positions indicated by "T", and the pixel blocks 1501 are arranged at positions indicated by "A". The pixel blocks 1401 and 1501 output information according to the respective difference detection modes.

The present exemplary embodiment has an effect of reducing circuit scale and power consumption compared with the above-described exemplary embodiments while enabling output using two difference detection modes.

Figure 17A:
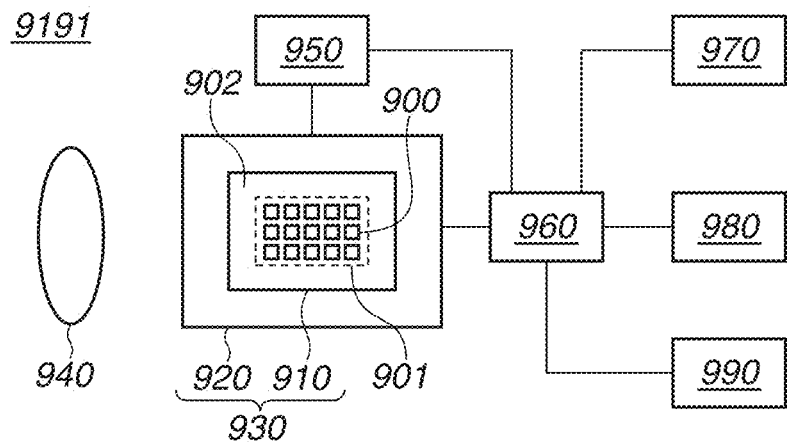
FIGS. 17A, 17B, and 17C are schematic diagrams illustrating configurations of devices according to a sixth exemplary embodiment.

A sixth exemplary embodiment will be described. The sixth exemplary embodiment can be applied to any of the first to fifth exemplary embodiments. FIG. 17A is a schematic diagram illustrating a device 9191 provided with a semiconductor apparatus 930 according to the present exemplary embodiment. The photoelectric conversion apparatus (image capturing apparatus) of each of the above-described exemplary embodiments can be used for the semiconductor apparatus 930.

The device 9191 provided with the semiconductor apparatus 930 will be described in detail. The semiconductor apparatus 930 can include a semiconductor device 910. The semiconductor apparatus 930 can include a package 920 that accommodates the semiconductor device 910 including a semiconductor layer 902. The package 920 can include a base member to which the semiconductor device 910 is fixed and a lid body, such as glass facing the semiconductor device 910. The package 920 can further include a bonding member, such as a bonding wire and a bump, that connects a terminal provided on the base member and a terminal provided on the semiconductor device 910.

The device 9191 can include at least an optical apparatus 940, a control apparatus 950, a processing apparatus 960, a display apparatus 970, a storage apparatus 980, or a mechanical apparatus 990. The optical apparatus 940 is used for the semiconductor apparatus 930. The optical apparatus 940 includes an optical system for guiding light to the semiconductor apparatus 930. Examples include a lens, a shutter, and a mirror. The control apparatus 950 controls the semiconductor apparatus 930. The control apparatus 950 is, for example, a semiconductor apparatus, such as an application specific integrated circuit (ASIC).

The processing apparatus 960 processes signals output from the semiconductor apparatus 930. The processing apparatus 960 is a semiconductor device, such as a central processing unit (CPU) or an ASIC used as an analog front end (AFE) or a digital front end (DFE). The display apparatus 970 is an electroluminescence (EL) display apparatus or a liquid crystal display apparatus that displays information (image) acquired by the semiconductor apparatus 930. The storage apparatus 980 is a magnetic device or a semiconductor device that stores information (image) acquired by the semiconductor apparatus 930. The storage apparatus 980 is a volatile memory, such as a static random access memory (SRAM) or a dynamic random access memory (DRAM), or a nonvolatile memory, such as a flash memory or a hard disk drive.

The mechanical apparatus 990 includes a movable unit or a propulsion unit, such as a motor or an engine. The device 9191 displays signals output from the semiconductor apparatus 930 on the display apparatus 970 and transmits the signals to the outside using a communication apparatus (not illustrated) provided in the device 9191. Thus, in one embodiment, the device 9191 further includes the storage apparatus 980 and the processing apparatus 960 separately from a storage circuit and an arithmetic circuit included in the semiconductor apparatus 930. The mechanical apparatus 990 can be controlled based on signals output from the semiconductor apparatus 930.

Further, the device 9191 is suitable for an electronic device, such as an information terminal having an imaging function (for example, a smartphone and a wearable terminal) and a camera (for example, an interchangeable lens camera, a compact camera, a video camera, and a monitoring camera). The mechanical apparatus 990 in a camera can drive components of the optical apparatus 940 for zooming, focusing, and shutter operations. Alternatively, the mechanical apparatus 990 in the camera can move the semiconductor apparatus 930 for an anti-vibration operation.

Further, the device 9191 can be a transport device, such as a vehicle, a ship, or a flying vehicle (a drone, an aircraft, or the like). The mechanical apparatus 990 in the transport device can be used as a mobile apparatus. The device 9191 as the transport device is suitable for transporting the semiconductor apparatus 930 and for assisting and/or automating driving (operation) using the imaging function. The processing apparatus 960 for assisting and/or automating driving (operation) can perform processing for operating the mechanical apparatus 990 as the mobile apparatus based on information acquired by the semiconductor apparatus 930. The device 9191 can be a medical device, such as an endoscope, a measurement device, such as a ranging sensor, an analytical device such as an electron microscope, an office device, such as a copy machine, or an industrial device, such as a robot.

According to the above-described exemplary embodiments, a good pixel characteristic can be obtained, increasing the value of the semiconductor apparatus. Increasing the value described here includes at least addition of functions, improvement of performance, improvement of characteristics, improvement of reliability, improvement of manufacturing yield, reduction of environmental burdens, cost reduction, miniaturization, or weight reduction.

Thus, the semiconductor apparatus 930 according to the present exemplary embodiment used in the device 9191 can increase the value of the device 9191. For example, the semiconductor apparatus 930 mounted on a transport device and used for imaging the outside of the transport device or measuring an external environment provides an excellent performance. Thus, it is beneficial in improving the performance of the transport device itself to determine to mount the semiconductor device according to the present exemplary embodiment thereon in manufacturing and selling the transport device. Particularly, the semiconductor apparatus 930 is suitable for the transport device that uses information acquired by the semiconductor apparatus to perform operation support and/or automatic operation of the transport device.

A photoelectric conversion system and the mobile apparatus according to the present exemplary embodiment are described with reference to FIGS. 17B and 17C.

Figure 17B:
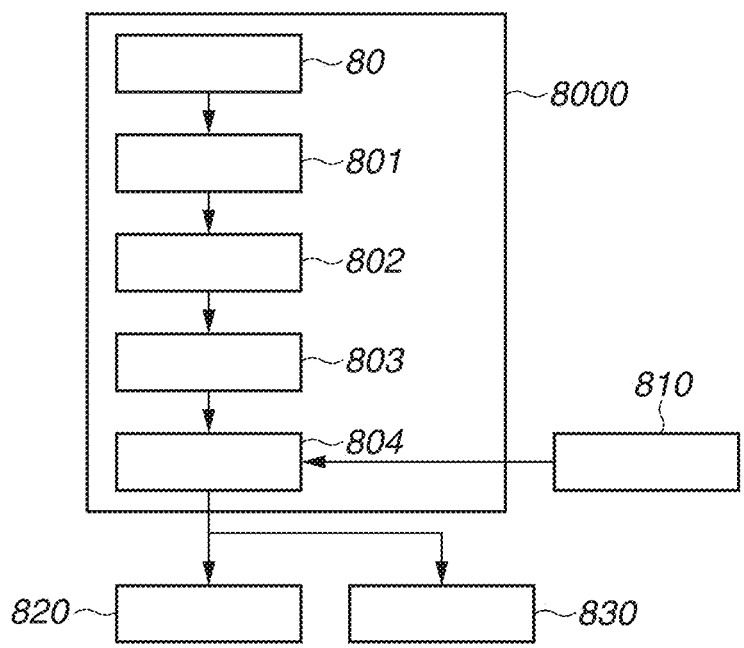
Figure 17C:
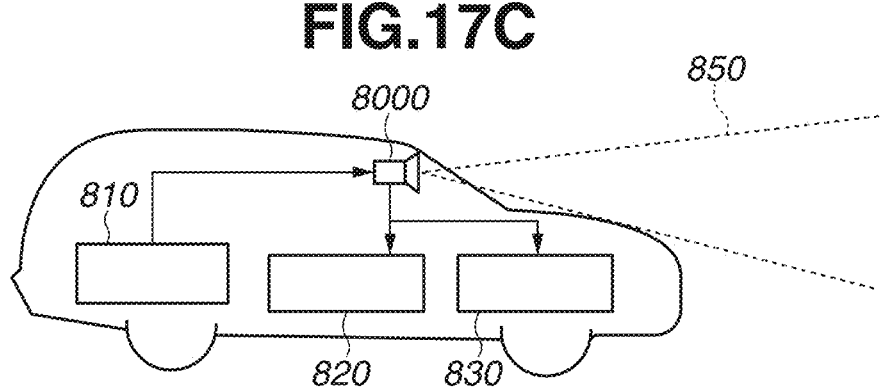

FIG. 17B illustrates an example of the photoelectric conversion system related to an on-vehicle camera. A photoelectric conversion system 8000 includes a photoelectric conversion apparatus 80. The photoelectric conversion apparatus 80 is a photoelectric conversion apparatus (image capturing apparatus) described in any of the above-described exemplary embodiments. The photoelectric conversion system 8000 includes an image processing unit 805 that performs image processing on a plurality of pieces of image data acquired by the photoelectric conversion apparatus 80 and a parallax acquisition unit 802 that calculates parallax (a phase difference of parallax images) from a plurality of pieces of image data acquired by the photoelectric conversion system 8000.

The photoelectric conversion system 8000 can include an optical system (not illustrated) that guides light to the photoelectric conversion apparatus 80, such as a lens, a shutter, or a mirror. Further, a plurality of photoelectric conversion units that is approximately conjugate to the pupil of the optical system can be arranged in a pixel included in the photoelectric conversion apparatus 80. For example, the plurality of photoelectric conversion units that is approximately conjugate to the pupil is arranged for a single microlens. The plurality of photoelectric conversion units receives light beams passing through different positions of the pupil of the optical system, so that the photoelectric conversion apparatus 80 outputs image data corresponding to the light beams passing through the different positions. Then, the parallax acquisition unit 802 can calculate parallax using the output image data.

The photoelectric conversion system 8000 also includes a distance acquisition unit 803 that calculates the distance to a target object based on the calculated parallax and a collision determination unit 804 that determines whether there is a possibility of collision based on the calculated distance. The parallax acquisition unit 802 and the distance acquisition unit 803 are examples of distance information acquisition units that acquire distance information about the target object. Specifically, the distance information is information regarding parallax, the amount of defocus, the distance to the target object, and the like. The collision determination unit 804 can use any of the pieces of distance information to determine the possibility of collision. The distance information can be acquired using TOF.

The distance information acquisition unit can be realized with a specially designed piece of hardware or software module. The distance information acquisition unit can also be realized with a field programmable gate array (FPGA), an ASIC, or a combination thereof.

The photoelectric conversion system 8000 is connected to a vehicle information acquisition apparatus 810 and can acquire vehicle information, such as a vehicle speed, a yaw rate, and a steering angle. The photoelectric conversion system 8000 is also connected to a control engine control unit (ECU) 820 that is a control apparatus that outputs a control signal for generating a braking force to the vehicle based on a determination result by the collision determination unit 804. The photoelectric conversion system 8000 is also connected to an alarm apparatus 830 that issues an alarm to a driver based on the determination result by the collision determination unit 804.

For example, if the collision determination unit 804 determines that there is a high possibility of collision, the control ECU 820 performs vehicle control to avoid the collision and reduce damage by applying the brake, releasing the accelerator, or reducing the engine output. The alarm apparatus 830 issues an alarm to a user by sounding an alarm, displaying alarm information on a screen of a car navigation system or the like, or vibrating a seat belt or a steering wheel.

According to the present exemplary embodiment, the photoelectric conversion system 8000 captures an image of surroundings, for example, front of or behind the vehicle. FIG. 17C illustrates the photoelectric conversion system 8000 in a case where an image of the front of the vehicle (an imaging range 850) is captured. The vehicle information acquisition apparatus 810 transmits an instruction to the photoelectric conversion system 8000 or the photoelectric conversion apparatus 80. This configuration can improve the accuracy of distance measurement can be further.

An example of controlling a vehicle to avoid collision with another vehicle is described above, but the disclosure can also be applied to control to automatically drive a vehicle by following other vehicles, or control to automatically drive a vehicle to prevent it from running out of its lane. Further, the photoelectric conversion system 8000 can be applied to not only a vehicle, such as an automobile but also, for example, a mobile apparatus, such as a ship, an aircraft, and an industrial robot. In addition, the photoelectric conversion system 8000 can be applied to not only the mobile apparatus but also a device that widely uses object recognition, such as intelligent transport systems (ITS).

In the present specification, expressions, such as "A or B", "at least one of A and B", "at least one of A and/or B", and "one or more of A and/or B" can include all possible combinations of listed items, unless explicitly defined otherwise. Specifically, the above-described expressions are understood to describe all cases of including at least one A, including at least one B, including both at least one A and at least one B. This understanding is also applied to combinations of three or more elements.

OTHER EMBODIMENTS

The above-described exemplary embodiments are merely examples for implementing the disclosure, so that the examples should not be construed restrictively limiting the technical scope of the disclosure. In other words, the disclosure can be implemented in various forms without departing from the technical idea or the main features thereof. For example, combinations of elements in each of the above-described exemplary embodiments are also within the scope of the disclosure.

Further, each of the above-described exemplary embodiments can be appropriately modified within the scope not departing from the technical idea. The disclosure of the present specification includes not only what is described in the present specification, but also all matters that can be understood from the present specification and the drawings attached thereto.

According to at least one of the exemplary embodiments of the disclosure, the accuracy of detecting a detection target can be improved using difference detection pixels.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-106779, filed Jun. 29, 2023, which is hereby incorporated by reference herein in its entirety.

What is claimed is:

1. An apparatus comprising:
a detection unit that includes a plurality of pixels for acquiring a plurality of pixel values based on amounts of light incident on the plurality of pixels and is configured to detect a difference between the plurality of pixel values; and
a control unit configured to control the detection unit,
wherein, to detect a movement of a subject, the control unit causes the detection unit to perform a first difference detection operation of detecting a difference between a plurality of pixel values of a pixel and a second difference detection operation of detecting a difference between the plurality of pixel values of the plurality of pixels.

2. The apparatus according to claim 1,
wherein the plurality of pixels includes a plurality of difference detection pixels, and
wherein the control unit causes the detection unit to detect a difference between a plurality of pixel values of the plurality of difference detection pixels that are closest to each other in the second difference detection operation.

3. The apparatus according to claim 2,
wherein the difference detection pixels further include a color filter, and
wherein the control unit causes the detection unit to detect the difference between the plurality of pixel values of the difference detection pixels provided with the color filter in the second difference detection operation.

4. The apparatus according to claim 3, wherein the control unit causes the detection unit to detect the difference between the plurality of pixel values of the difference detection pixels that are closest to each other among the difference detection pixels provided with the color filter in the second difference detection operation.

5. The apparatus according to claim 2, wherein the plurality of pixels includes a pixel for acquiring image data.

6. The apparatus according to claim 1, wherein the detection unit includes a subtraction unit configured to derive a difference between the plurality of pixel values, a selection unit configured to select a pixel value to be input to the subtraction unit according to a signal from the control unit, and a unit configured to compare the difference with a predetermined value and output a result of the comparison to outside of the detection unit.

7. The apparatus according to claim 1, further comprising a movement detection unit configured to detect whether the apparatus is moving or stopped,
wherein the control unit causes the detection unit to perform either the first difference detection operation or the second difference detection operation according to a result of detection by the movement detection unit.

8. The apparatus according to claim 7, wherein the control unit causes the detection unit to perform the first difference detection operation in a case where the movement detection unit detects movement of the apparatus and to perform the second difference detection operation in a case where the movement detection unit detects stop of the apparatus.

9. The apparatus according to claim 1, wherein the control unit causes the detection unit to perform the second difference detection operation in a case where the apparatus performs a focus detection operation based on the difference.

10. The apparatus according to claim 9, wherein the control unit causes the detection unit to perform the second difference detection operation in a case where a difference is not detected within a predetermined period in the first difference detection operation.

11. The apparatus according to claim 1, further comprising an illuminance detection unit,
wherein the control unit causes the detection unit to perform the second difference detection operation in a case where the illuminance detection unit detects illuminance variation.

12. The apparatus according to claim 1, wherein the control unit causes the detection unit to perform the second difference detection operation according to a result of the first difference detection operation.

13. The apparatus according to claim 12, wherein the control unit causes the detection unit to perform the second difference detection operation in a case where a difference is detected within a predetermined period in the first difference detection operation.

14. The apparatus according to claim 1, further comprising a storage unit,
wherein the control unit causes the detection unit to perform either the first difference detection operation or the second difference detection operation according to a program stored in the storage unit.

15. The apparatus according to claim 14, wherein the program is based on time information.

16. The apparatus according to claim 1,
wherein the detection unit includes a plurality of areas, each area including at least one pixel of the plurality of pixels, and
wherein the control unit causes the detection unit to perform either the first difference detection operation or the second difference detection operation for each of the plurality of areas.

17. A device provided with the apparatus according to claim 1, the device comprising at least any one of:
an optical apparatus configured to guide light to the apparatus;
a control apparatus configured to control the apparatus;
a processing apparatus configured to process a signal output from the apparatus;
a display apparatus configured to display information acquired by the apparatus;
a storage apparatus configured to store information acquired by the apparatus; and
a mechanical apparatus configured to operate based on information acquired by the apparatus.

18. A system comprising:
an apparatus that includes a plurality of pixels for acquiring a plurality of pixel values based on amounts of light incident on the plurality of pixels;
a detection unit configured to detect a difference between the plurality of pixel values;
a post-processing unit configured to detect a movement of a subject using an output from the detection unit; and
a control unit configured to control the detection unit,
wherein the control unit causes the detection unit to perform a first difference detection operation of detecting a difference between the plurality of pixel values of a pixel and a second difference detection operation of detecting a difference between the plurality of pixel values of the plurality of pixels.

19. A method for processing a signal of a device including an apparatus that includes a plurality of pixels for acquiring a plurality of pixel values based on amounts of light incident on the plurality of pixels, a detection unit configured to detect a difference between the plurality of pixel values, and a control unit configured to control the detection unit, the method comprising:

to detect a movement of a subject, selecting by the control unit for causing the detection unit to perform a first difference detection operation of detecting a difference between the plurality of pixel values of a pixel and a second difference detection operation of detecting a difference between the plurality of pixel values of the plurality of pixels.

* * * * *